Nov. 29, 1949 T. W. PAUL 2,489,385
SCRAPER FOR DISKS OF GRAIN DRILLS
Filed Jan. 15, 1945

INVENTOR.
TALBERT W. PAUL

ATTORNEYS

Patented Nov. 29, 1949

2,489,385

UNITED STATES PATENT OFFICE 2,489,385

SCRAPER FOR DISKS OF GRAIN DRILLS

Talbert W. Paul, Moline, Ill., assignor to Deere & Company, Moline, Ill., a corporation of Illinois Application January 15, 1945, Serial No. 572,920

2 Claims. (Cl. 97—223)

The present invention relates generally to grain drills and more particularly to grain drills of the type having disk furrow openers.

The object and general nature of the present invention is to provide new and improved scrapers for the furrow openers of grain drills and their like, and more particularly, it is a feature of this invention to provide a scraper that is especially adapted for operation with the higher tractor speeds. Grain drills of the conventional type have a plurality of rather closely spaced furrow openers, each with a seed tube extending downwardly thereto from a common seed container. It is sometimes desirable or necessary to employ scrapers when using the disk type furrow openers, either a single disk furrow opener or a double disk furrow opener, the function of the scrapers being to clean the disks of adhering soil. Conventional scrapers are usually made in the form of a flat blade with a suitable connecting stem or supporting shank, and it has been found that when operating the grain drill at the higher speeds permissible when using the tractor, the flat blades tend to deflect the soil removed from the disk, sometimes directing the soil with sufficient force to cause it to plug up the seed boot of the adjacent furrow opener. One of the important features of the present invention is to provide a new and improved scraper which, irrespective of the speed of travel, not only removes the adhering soil from the associated disk but directs the loosened soil downwardly and away from the adjacent disks and seed boots and tubes. In this way, there is no likelihood of soil removed by the scrapers interfering with the proper operation of the adjacent furrow openers.

Another important feature of the present invention is the provision of a new and improved scraper which deflects the soil removed from the disk in a generally downward and rearward direction away from the adjacent furrow opener. More specifically, it is a feature of this invention to provide new and improved scraper means which, irrespective of the speed of travel, not only removes the adhering soil from the associated disk but additionally directs the loosened soil downwardly and rearwardly into the furrow opened by the associated disk, thus filling up, at least partially, the furrow and eliminating the usual covering chains or the like. In this way, the field is left practically level.

These and other objects and advantages of the present invention will be apparent to those skilled in the art after a consideration of the following detailed description of the preferred embodiment, taken in conjunction with the accompanying drawings.

Figure 1:
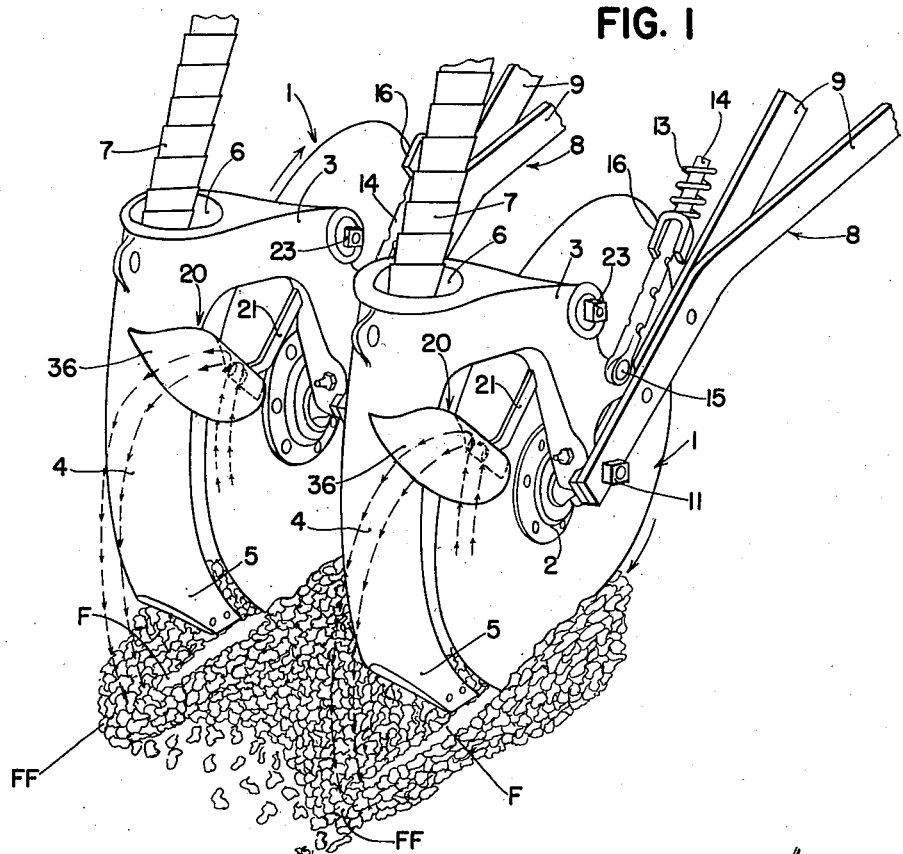
Figure 1 is a perspective view showing a pair of grain drill disk furrow openers equipped with a scraper constructed according to the principles of the present invention.

Referring first to Figure 1, each of the furrow openers shown, it being understood that the ordinary grain drill usually includes a series of furrow openers, only two of which are shown in Figure 1, comprises a dished or concave disk 1 connected by bearing means 2 to a supporting arm 3 formed, preferably but not necessarily integrally, with a seed boot 4. The latter is formed with an outlet end 5 that is adapted to lie behind the rear portion of the disk 1, the latter being normally disposed at an angle to the line of advance. The seed boot 4 is formed with a seed passage 6 therein and large enough at the upper end to receive loosely the lower end of a flexible tube 7 which is connected at its upper end (not shown) to the seed dispensing or distributing means of the drill. A drag bar 8, preferably including a pair of strap members 9, is bolted, as at 11, to the forward end of the seed boot arm 3. Each drag arm 8 is connected at its upper end to the frame of the grain drill, the latter having suitable pressure arms fixed to a pressure shaft and connected to apply downward pressure through a compression spring 13 to the lower end of a rod member 14 that is pivotally connected, as at 15, to the seed boot arm 3. The rods 14 also serve as means whereby the furrow openers may be raised out of contact with the ground or forced into the ground by virtue of the pressure transmitted downwardly thereto by the compression springs 8. Each compression spring bears at its lower end against an adjustable abutment 16.

The scraper means with which the present invention is more particularly concerned is indicated in its entirety by the reference numeral 20. The scraper 20 comprises a stem or shank 21 bolted, as at 23, to the seed boot arm 3. An attaching blade 25 is secured, as by a rivet 26, to the lower bent end of the stem or shank 21 and is itself apertured to receive a pair of rivets 27 by which the combined scraper and deflector 28 may be secured to the lower end of the stem 21.

The attaching blade 25, may, if desired, serve as the soil removing element or the adjacent edge of the deflector or shield 28 may perform this function. Further, if desired, the blade 25 may be entirely omitted and the deflector 28 fixed directly to the lower end of the stem 21, as by the rivet 26 or the equivalent.

Figures 2, 3:
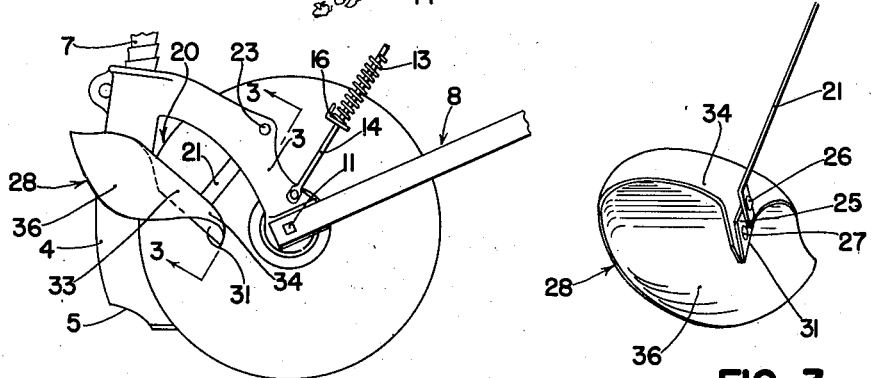
Figure 2 is a side view of one of the scrapers and associated disks.
Figure 3 is an end view of my new and improved scraper, corresponding generally to a view taken along the line 3—3 of Figure 2.

The deflector or shield 28 is of particular construction. It is provided with a soil removing edge 31 which, as just mentioned may entirely replace the attaching blade 25 so far as its soil-removing function is concerned. This is the portion of the deflector shield that comes practically into direct contact with the concave side of the disk 1, as best shown in Figures 1 and 2. Upwardly and rearwardly of the edge 31, the shield curves laterally outwardly and rearwardly, as indicated at 33, the forwardmost edge of this portion, as shown at 34, being concave on its under side or bent over to form a downwardly extending flange, insuring that any soil removed by the edge 31 and/or the blade 25 will not be thrown forwardly but will, instead, be directed laterally outwardly and generally rearwardly, to which end the unit 20 is mounted in a rearwardly and upwardly inclined position, as shown in Figure 2. The laterally and outwardly curving section 33 is, toward the rear portion of the shield 28, bent downwardly and somewhat laterally inwardly, as at 36. This curved portion of the shield, which extends generally to a point almost directly rearwardly of the disk and adjacent portions of the seed boot 4, serves to direct the soil removed from the disk directly downwardly into the furrow opened by the associated disk. In Figure 1 the furrows are indicated, respectively, by the reference numeral F.

In operation, the disks 1 rotate in the direction of the full line arrows and the path of movement of the adhering soil that is removed by each deflector is indicated generally by the dotted line arrows. The soil, thus directed by the deflectors 20, fill up the furrows F, as indicated at FF. This tends to leave the field flat and serves to prevent loss of top soil in the event of heavy rains which otherwise tend to run down the furrows and wash away not only the top soil but also the seed.

While I have shown and described above the preferred construction in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A scraper for the disk of a grain drill furrow opener or the like, in which the disk normally is disposed in a generally fore and aft extending vertical plane, said scraper comprising a generally semi-cylindrical forward portion having a soil-removing edge section lying generally in an upwardly and rearwardly extending line, and a soil-deflecting portion lying laterally outwardly of said edge and terminating at the laterally outer side thereof in a generally downwardly extending section lying generally laterally opposite said edge, and a rear portion forming a continuation of said laterally outwardly disposed soil deflecting portion and extending laterally inwardly, upwardly and rearwardly and including an upper curved section joining the rear and upper portion of said edge section, thereby cooperating with the soil-removing edge and soil-deflecting portion of said forward portion to guide the deflected soil, removed from the disk by said soil-removing edge and deflected laterally outwardly and upwardly by said forward portion of the scraper, rearwardly, laterally inwardly and downwardly to deposit the soil substantially rearwardly of said disk.

2. For use in a grain drill having a generally vertical disk furrow opener and a seed boot the lower end of which is disposed substantially directly rearwardly of the disk and normally moves along the furrow opened by said disk, a scraper and soil deflector comprising a generally semi-cylindrical forward portion having a soil-removing edge section lying generally in an upwardly and rearwardly extending line and a soil-deflecting portion lying laterally outwardly of said edge and terminating at the laterally outer side thereof in a generally downwardly extending section lying generally laterally opposite said edge, and a rear portion adapted to be disposed laterally of the seed boot, said rear portion forming a continuation of said laterally outwardly disposed soil deflecting portion and extending laterally inwardly, upwardly and rearwardly and including an upper curved section adapted to extend generally rearwardly of said seed boot, said upper curved section joining the rear and upper portion of said edge section, thereby cooperating with the soil-removing edge and soil-deflecting portion of said forward portion to guide the deflected soil, removed from the disk by said soil-removing edge and deflected laterally outwardly and upwardly by said forward portion of the scraper, rearwardly, laterally inwardly around the seed boot and downwardly to deposit the soil substantially rearwardly of said seed boot and said disk.

TALBERT W. PAUL.

REFERENCES CITED

The following references are of record in the file of this patent:

UNITED STATES PATENTS

| Number | Name | Date |
|---|---|---|
| 659,881 | Van Brunt | Oct. 16, 1900 |
| 715,257 | Gillham | Dec. 9, 1902 |
| 718,512 | Packham | Jan. 13, 1903 |
| 885,080 | Pelton | Apr. 21, 1908 |
| 921,357 | Brown | May 11, 1909 |
| 1,104,569 | Stephens | July 21, 1914 |
| 1,105,570 | Lea | July 28, 1914 |
| 1,113,773 | Garrity | Oct. 13, 1914 |
| 1,726,278 | Strandlund | Aug. 27, 1929 |